J. C. TAYLOR.
SAND DELIVERY DEVICE FOR VEHICLES.
APPLICATION FILED DEC. 18, 1920.
1,421,745. Patented July 4, 1922.
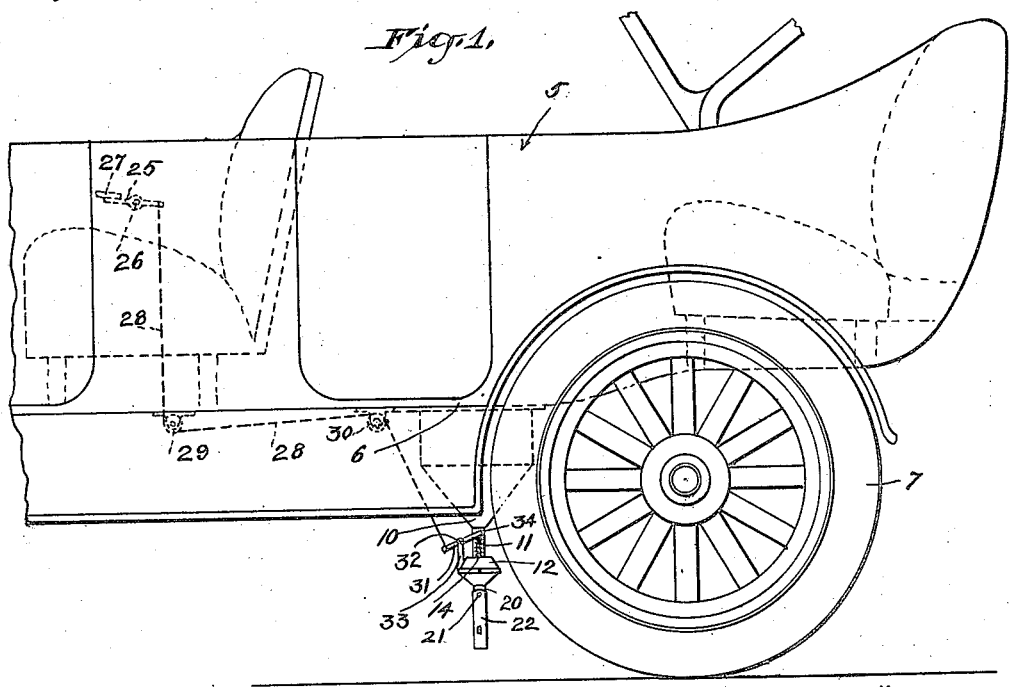
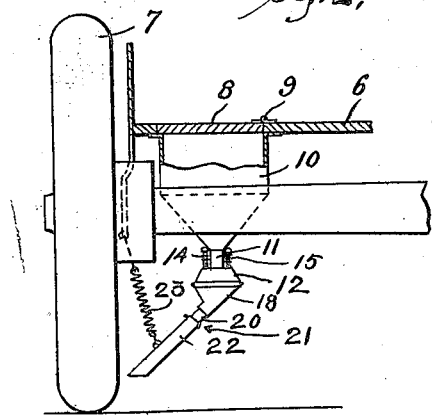
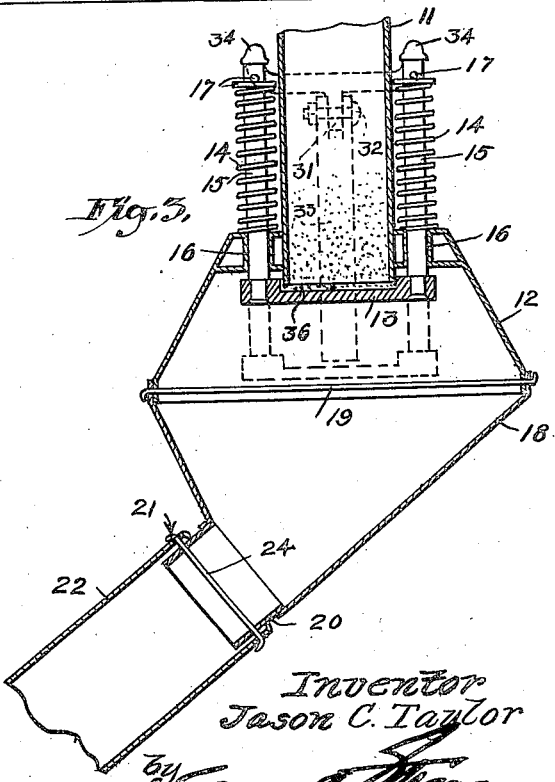
Inventor
Jason C. Taylor

UNITED STATES PATENT OFFICE.

JASON C. TAYLOR, OF LOS ANGELES, CALIFORNIA.

SAND-DELIVERY DEVICE FOR VEHICLES.

1,421,745.   Specification of Letters Patent.   Patented July 4, 1922.

Application filed December 18, 1920. Serial No. 431,551.

*To all whom it may concern:*

Be it known that I, JASON C. TAYLOR, a citizen of the United States, residing at Los Angeles, county of Los Angeles, and State of California, have invented new and useful Improvements in Sand-Delivery Devices for Vehicles, of which the following is a specification.

My invention relates to sand delivery devices, and is particularly adapted to be mounted on a motor driven vehicle, whereby sand may be delivered on the surface of the ground adjacent the wheels of a vehicle to prevent the sliding or skidding of the same when running on slippery roads.

The main object of my invention is to provide a suitable receptacle adapted to be mounted on the vehicle, and containing a supply of sand or other material of a frictional nature, having a trough or tube leading therefrom to a spot on the surface of the ground ahead of and adjacent one side of the vehicle wheel or wheels, and a valve interposed between the supply receptacle and the free end of the trough or tube, under the control of the vehicle operator, whereby a supply of the sand may be instantly delivered on the ground in the path of the vehicle wheels when said wheels begin to slip or skid on the ground.

Another object of my invention is to provide a trough or tube through which the frictional material is delivered, which is resiliently mounted on the vehicle, in order that it will yield when encountering an obstruction in the road, as well as vibrate by the motion of the vehicle in order that the material will be evenly distributed in a thin layer over a sufficient area, in the path of the vehicle wheels.

Other objects will be apparent from the following description, will be pointed out in the claims, and will be embodied in the accompanying drawings, in which:

Fig. 1 represents a side view of the rear portion of an automobile, showing my invention applied thereto, the delivery tube supporting spring being omitted for the sake of clearness.

Fig. 2 is a fragmental rear view of the left side of an automobile, showing my invention as it would appear when mounted to supply the frictional material to the left rear wheel, parts being broken away and shown in section.

Fig. 3 is an enlarged sectional view of the control valve.

In carrying out my invention 5 represents an automobile, 6 the floor, and 7 the rear left hand wheel thereof. The floor 6 is provided with a trap door 8, hinged at 9, and secured to the lower surface of the floor 6 is a sand hopper 10 provided at its lower end with a tube 11 to which is secured the valve casing 12 adapted to house the valve 13 which is arranged underneath the open end of tube 11 and adapted to reciprocate upwardly and downwardly to close or open the end of said tube and control the flow of the sand therethrough.

The valve 13 is normally held in contact with the lower end of tube 11 to shut off the flow of sand, by means of the coil springs 14 which surround the stems 15, the lower ends of which are secured to said valve. The stems 15 pass upwardly through the guiding sleeves 16 formed in the upper end of casing 12 to the outside of said casing, and the springs 14 are interposed between the top wall of said casing and the pins 17 which pass through said stems adjacent the top ends thereof.

By the above recited construction, it will be seen that by pressing downwardly on the stems 15, the valve 13 will be depressed, and uncover the end of tube 11, thereby admitting the sand into the casing 12, the lower portion 18 being detachably secured to said casing by means of a pin 19 passing through apertures formed in the upper and lower portions of said casing.

The lower portion 18 of said casing is preferably conical in form and is provided with an outlet tube 20, to which is secured by means of a universal joint 21, the delivery tube 22. The open lower end of tube 22 is adapted to project toward the surface of the ground in a position just forward of and inside of the left rear wheel 7 of the vehicle, and is resiliently held in such position by means of the spring 23 which is secured at one end to said tube and at its opposite end to the body of the vehicle. The joint 21 is formed by means of a pin 24 which passes through apertures in tubes 20 and 22, said apertures being of somewhat larger diameter than the diameter of said pin.

In order that the valve 13 may be quickly opened, when desired, by the operator, a lever 25 is pivoted at 26 to the car body, adjacent the operator's seat, and is provided at one of its ends with a push button 27, and secured to its opposite end is a flexible cable 28 which passes downwardly over the sheaves 29 and 30 mounted on the vehicle body. The other end of cable 28 is secured to one end of a lever 31 which is pivoted at 32 to a standard 33 secured to the casing 12. The opposite end of lever 31 is bifurcated to form the fingers 34, which engage with the top ends of stems 15.

By the foregoing recited arrangement it will be obvious that the operator may at will, by simply pressing the button 27, deliver a desired quantity of sand to the road in the path of a skidding wheel, thus effectually arresting the skidding or sliding motion.

When the valve 13 is opened as shown in dotted lines in Fig. 3, the sand from receptacle 10 passes into the hopper bottom 18 and during its downward movement pours over the edge of said valve and becomes separated and spread thereby. The pins 19 and 24 also aid in separating and spreading the sand, and finally the vibratory movement of the delivery tube 22 causes the sand to be delivered evenly and in a thin layer in the path of the vehicle wheel.

I have found in practice that the skidding of the vehicle is effectively prevented by delivering the sand to the ground adjacent the rear left hand wheel thereof, as the tendency of the vehicle is to skid toward the right or on the down grade of the road; but it will be obvious that my device may be so arranged as to deliver the sand adjacent any or all of the vehicle wheels, and in any desired relation thereto.

By forming a depression 36 in the top surface of valve 13 it will be observed that a small quantity of the sand will at all times remain on top of said valve, and when the valve is closed the end of tube 11 will become buried in said sand, thus forming a very effective cushioned seal for the mouth of said tube.

What I claim is:

1. A device of the class described, comprising a sand hopper mounted on a vehicle and adapted to receive a frictional material, a tube extending from the bottom of said hopper, a casing surrounding said tube, a valve mounted in said casing adapted to open and close the end of said tube and spread said frictional material when flowing therethrough, a delivery tube mounted for universal movement at the bottom of said casing, means for resiliently supporting said second mentioned tube, and means under the control of an occupant of said vehicle for operating said valve.

2. A device of the class described, comprising a sand hopper mounted on a vehicle, a tube leading from said hopper, a valve mounted for reciprocatory movement below the end of said tube, the top surface of said valve being provided with a depression into which the end of said tube is adapted to project, whereby the end of said tube will be sealed when said valve is closed, and means mounted on said vehicle for operating said valve.

3. A device of the class described, comprising a sand hopper adapted for placement on a vehicle and having a sand delivery opening formed therein, a valve casing secured to said hopper and communicating with the opening formed therein, a spring pressed valve mounted in said valve casing and controlling the opening of said sand hopper, a sand delivery tube leading from said valve casing, means for permitting a vibratory movement of said delivery tube during the operation of the device, whereby to prevent clogging of the tube and to assist in an even distribution of the sand in front of the vehicle wheels, and manually operated means for operating said valve.

In witness that I claim the foregoing I have hereunto subscribed my name this 7th day of December, 1920.

JASON C. TAYLOR.